(12) United States Patent
Tsukada

(10) Patent No.: US 7,178,650 B2
(45) Date of Patent: Feb. 20, 2007

(54) STRUCTURE OF MULTIPLE DISC CLUTCH

(75) Inventor: Yoshiaki Tsukada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 11/067,890

(22) Filed: Mar. 1, 2005

(65) Prior Publication Data
US 2005/0194230 A1    Sep. 8, 2005

(30) Foreign Application Priority Data
Mar. 4, 2004    (JP) ............... 2004-060699

(51) Int. Cl.
*F16D 13/00*    (2006.01)
*F16D 13/52*    (2006.01)
(52) U.S. Cl. ............... 192/70.27; 192/89.22; 192/90; 192/91 A
(58) Field of Classification Search ............... 192/89.26
See application file for complete search history.

(56) References Cited

U.S. PATENT DOCUMENTS 4,613,026 A * 9/1986 Ohzono et al. ........... 192/89.21
5,617,938 A * 4/1997 Tsukada et al. ........... 192/89.22
5,687,821 A * 11/1997 Lorriette .................... 192/91 A
6,578,690 B2 * 6/2003 Gochenour ................. 192/91 A

FOREIGN PATENT DOCUMENTS

| JP | 59-222625 A | * 12/1984 |
| JP | 62-16834 U  |   1/1987  |
| JP | 1-238720 A  | *  9/1989 |

* cited by examiner

*Primary Examiner*—Rodney H. Bonck
(74) *Attorney, Agent, or Firm*—Birch, Stewart, Kolasch & Birch, LLP

(57) ABSTRACT

A multiple disc clutch including a clutch outer and a clutch inner, for enabling a gentle releasing/engaging operation. The multiple disc clutch includes a clutch inner having a clutch center and a clutch piston, and outer and inner friction discs being alternately arranged between the clutch center and the clutch piston. A clutch spring performs energization to narrow an interval between the clutch center and the clutch piston. A clutch release mechanism reduces friction force between the outer and inner friction discs and releases an engaged state of the clutch by widening the interval between the clutch center and the clutch piston. A release spring is provided between the clutch piston and the clutch release mechanism.

20 Claims, 5 Drawing Sheets

STRUCTURE OF MULTIPLE DISC CLUTCH

CROSS-REFERENCE TO RELATED APPLICATIONS

The present non-provisional application claims priority under 35 USC 119 to Japanese Patent Application No. 2004-060699 filed on Mar. 4, 2004 the entire contents thereof is hereby incorporated by reference.

BACKGROUND OF THE INVENTION

1. Field of the Invention

The present invention relates to a structure of a multiple disc clutch.

2. Description of Background Art

In general, a multiple disc clutch has a structure including a clutch outer, a clutch center, and an axially movable clutch piston, in which a plurality of axially movable outer friction discs provided on a clutch outer side and a plurality of axially movable inner friction discs provided on a clutch center side are arranged in an alternately stacked manner between the clutch center and the clutch piston. Release/engagement of the clutch is performed by axially moving the clutch piston.

In the conventional clutch with the above-described structure, a delicate operation has been required for gently releasing/engaging the clutch in the case of releasing/engaging the clutch.

Heretofore, there has been an example were a disc spring is mounted between the clutch piston and the friction discs. For example, see Japanese Utility Model Laid-Open No. S62 (1987)-16834, FIG. 2. However, in Japanese Utility Model Laid-Open No. S62 (1987)-16834, the clutch piston and the disc spring are provided in series, and it is difficult to change the respective characteristics thereof.

SUMMARY AND OBJECTS OF THE INVENTION

The present invention attempts to enable a gentler release/engagement operation in the multiple disc clutch.

The present invention has solved the foregoing problem. The invention relates to a structure of a multiple disc clutch including a clutch outer and a clutch inner, wherein the clutch inner is composed of a clutch center and a clutch piston, and outer friction discs and inner friction discs are alternately arranged between both of the members constituting the clutch inner. A clutch spring is provided which performs energization to narrow an interval between both of the members constituting the clutch inner. A clutch release mechanism is provided which reduces friction force between the outer friction discs and the inner friction discs and releases an engaged state of the clutch by widening the interval between both of the members constituting the clutch inner. A release spring is provided between the clutch piston and the clutch release mechanism.

In the present invention the release spring is opposite to the clutch spring, and is provided in the inside of a place where the friction discs are arranged.

In the present invention the clutch spring has a disc spring shape, and the release spring has a coil spring shape.

In the present invention the clutch release mechanism is operated by an actuator motor with electronic control.

According to the present invention, the operation of releasing/engaging the clutch can be performed gently, and operability thereof is improved.

According to the present invention, both of the springs are arranged compactly, thus enabling a reduction of size in a clutch device.

According to the present invention, the thinning of the clutch spring and the ensuring of the size of the release spring are implemented, and spring characteristics thereof can be optimized.

According to the present invention, control of the clutch operation is facilitated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
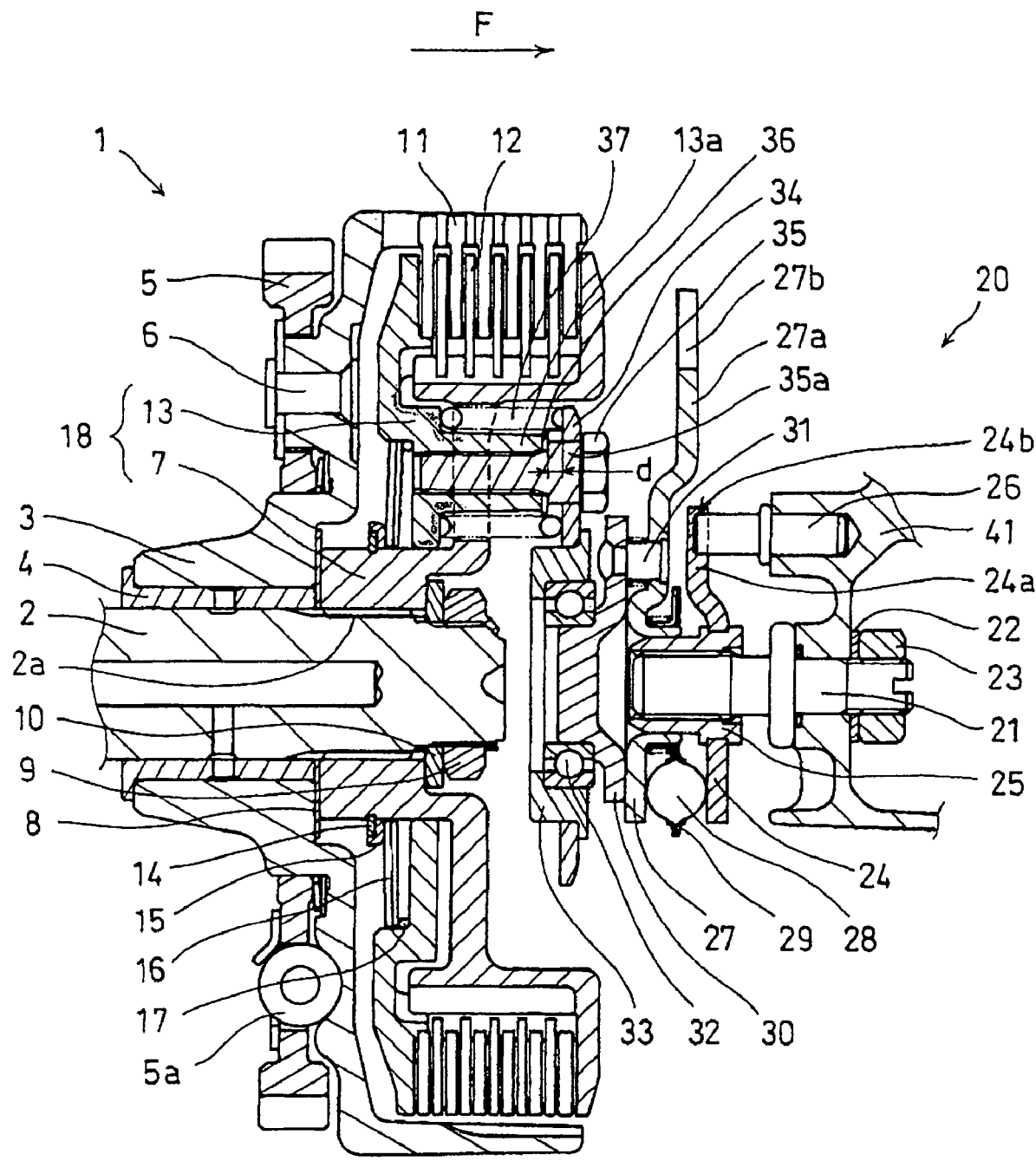
FIG. 1 is a longitudinal cross-sectional view of a multiple disc clutch 1 according to a first embodiment of the present invention.

FIG. 1 is a longitudinal cross-sectional view of a multiple disc clutch 1 according to a first embodiment of the present invention. This clutch operatively connected to a rotational power transmission drive from a crankshaft (not shown) of a power unit toward a main shaft of a transmission in a saddle riding vehicle, and is engaged and released in response to a gear change operation of a driver. In the drawing, an arrow F indicates the front in the traveling direction of the vehicle. In the above-described saddle riding vehicle, both of the crankshaft and the main shaft of the transmission are placed in parallel to the traveling direction of the vehicle.

To the main shaft 2 of the transmission, a clutch outer 3 is freely fitted with a sleeve 4 interposed therebetween so as to be rotatable with respect to the above-described main shaft 2. To the clutch outer 3, a body portion of a driven gear 5 is fixed by a rivet 6. A shock-absorbing member 5a is provided between the body portion of the driven gear 5 and a peripheral gear portion. The driven gear 5 meshes with a drive gear (not shown) provided on the crankshaft.

Onto the main shaft 2, a clutch center 7 is attached with a spline 2a interposed therebetween so as not to rotate. An annular member 8 is interposed between a boss portion of the clutch outer 3 and a boss portion of the clutch center 7, and a main shaft end side of the clutch center 7 is fixed by a nut 9 and a washer 10. More specifically, the clutch center 7 is fixed to the main shaft 2 of the transmission.

In the clutch outer 3 and the clutch center 7, a plurality of outer friction discs 11 and inner friction discs 12 are held, respectively, so as to be axially slidable and not to be rotatable about the main shaft, and are arranged in an alternately stacked state. Onto an outer periphery of the boss portion of the clutch center 7, a clutch piston 13 is attached so as to be axially slidable. In the clutch piston 13, a plurality of projecting portions 13a are provided, that are inserted into a plurality of through holes provided in the clutch center 7, and project forward (rightward in FIG. 1). Thus, the clutch center 7 and clutch piston 13 rotate integrally in the rotational direction about the main shaft 2. In this clutch 1, a clutch inner 18 is composed of the clutch center 7 and the clutch piston 13. The above-described outer and inner friction discs 11 and 12 are arranged in the alternately stacked manner and are sandwiched between an outer peripheral portion of the clutch center 7 and an outer peripheral portion of the clutch piston 13. More specifically, in the clutch inner 18, the outer friction discs 11 and the inner friction discs 12 are arrayed to be sandwiched by two members constituting the clutch inner 18.

A clutch spring 16 is a disc spring type having an inner periphery side that is engaged by a clip 14 and a retainer 15, which are attached onto the boss portion of the clutch center 7, for pushing the clutch piston 13 by an outer periphery side thereof through a spring set ring 17. The clutch spring 16 is energization in a direction wherein the clutch piston 13 is made to approach the fixed clutch center 7, and the clutch piston 13 presses the outer and inner friction discs 11 and 12 in a direction of engaging the clutch 1.

An operating unit 20 of the multiple disc clutch is provided in the right portion of the drawing. To a front cover 41 of a power unit casing, an operating unit fixing shaft 21 is fixed by a nut 23 with a washer 22 interposed therebetween. Onto the operating unit fixing shaft 21, a cam nose member 24 is attached to be held by a cam nose member holding cylinder 25. One end of an engaging pin 26 is fitted and fixed into a hole in the front cover 41, the other end of the engaging pin 26 is fitted into a concave portion 24b of an engaging portion 24a provided on part of the periphery of the cam nose member 24. Thus, a rotational movement of the cam nose member 24 is restricted.

Onto an outer periphery of the cam nose member holding cylinder 25, an operating member 27 is attached so as to be rotationally movable and axially slidable. Between the cam nose member 24 and the operating member 27, three steel balls 28 are attached to be held by a steel ball holding member 29. Part of an outer peripheral portion of the operating member 27 extends outwardly, thereby forming an operating lever 27a. In a tip of the operating lever 27a, an engaging groove 27b is provided, wherein a roller 63 on a tip of a clutch arm 62 to be described later is engaged. To the above-described operating member 27, a pressing force transmission member 30, fitted into an inner ring of a ball bearing 32, is fixed by a rivet 31. The pressing force transmission member 30 is rotationally movable and axially movable together with the operating member 27. Onto an outer ring of the ball bearing 32, a coupling plate 34 is attached with an annular member 33 interposed therebetween. In a peripheral portion of the above-described coupling plate 34, a plurality of through holes are provided, and bolts 35 penetrating respective the through holes are screwed and fixed into female screw holes provided in the projecting portions 13a of the clutch piston 13 while interposing washers 36 abutting on end surfaces of large-diameter portions 35a of the bolts 35.

In each large-diameter portion 35a of the above-described bolts 35, the coupling plate 34 is movable in an axial direction of the bolt 35 between the head of the bolt 35 and the washer 36. Such a movable gap d is 2 mm in this embodiment. Between the coupling plate 34 and the clutch piston 13, a release spring 37 of a coil spring type is provided which exhibits a helical shape around each projecting portion 13a of the clutch piston 13. In a normal state (clutch engaged state), the energizing force of the release spring 37 is zero or an extremely small energizing force in comparison with energizing force of the clutch spring. When the release spring 37 is pushed and compressed by the coupling plate 34 and an energizing force exceeding the energizing force of the clutch spring 16 occurs, the clutch piston 13 moves by the energizing force of the release spring 37, and the engagement of the clutch 1 is released. It is desirable that a position where the energizing force of the release spring 37 exceeds the energizing force of the clutch spring 16 be set before the gap between the coupling plate 34 and the washer 36 disappears, that is, before the position where the coupling plate 34 abuts on the washer 36. Alternatively, the above-described position may be set in the vicinity of a position of the washer 36 when the clutch piston 13 is located at an initial position, position of the clutch piston 13 when the clutch is engaged, which is shown in FIG. 1.

Figure 2:
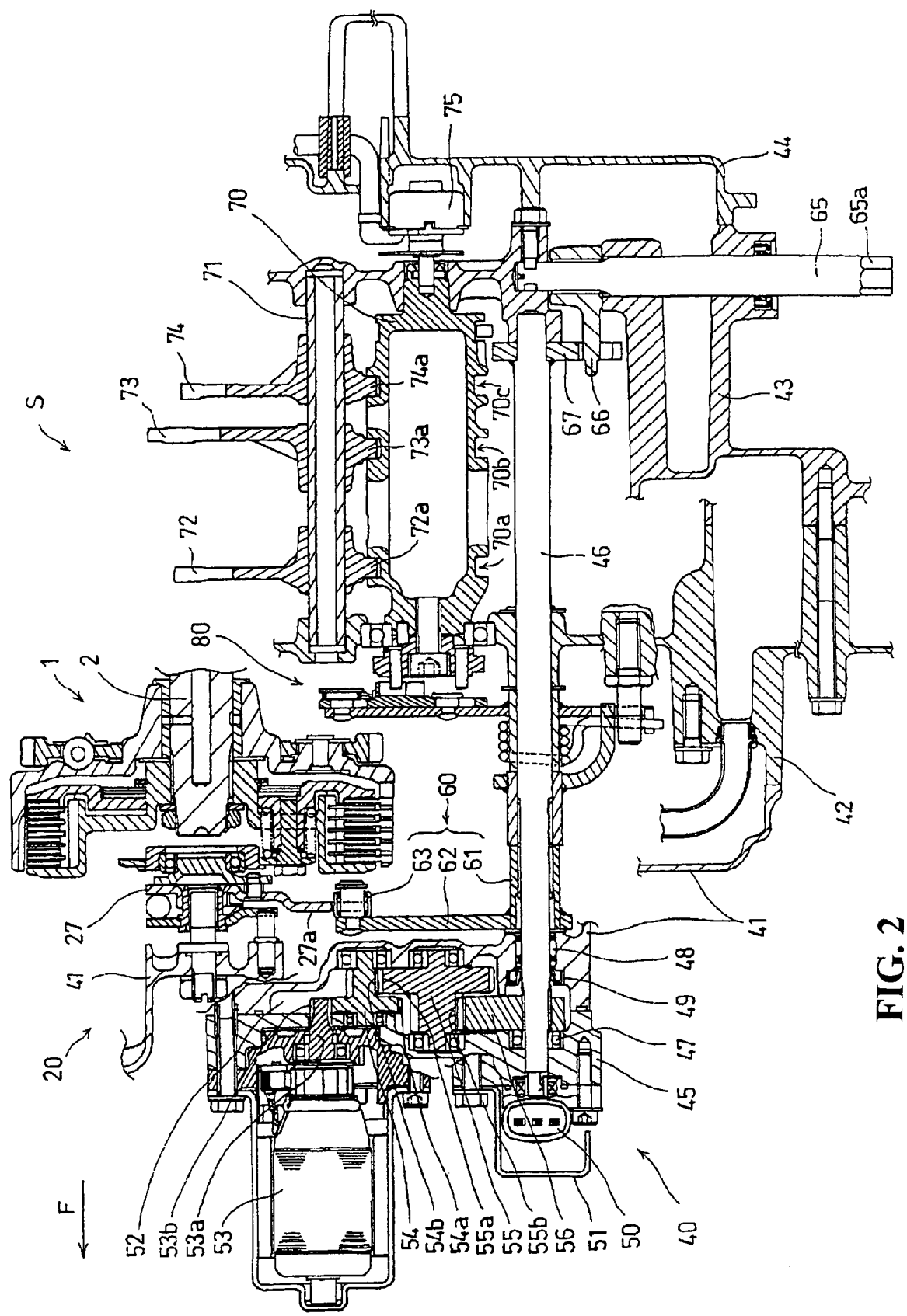
FIG. 2 is a configuration view of a shift mechanism S in a power unit of a saddle riding vehicle.

FIG. 2 is a view of a shift mechanism S in the power unit of the saddle riding vehicle. The shift mechanism S is formed of an actuator mechanism 40, a clutch operating mechanism 60, and a gear change mechanism 80. In the drawing, an arrow F indicates the front of the vehicle. An outer shell of the power unit is composed of the front cover 41, a front casing 42, a rear casing 43, and a rear cover 44 in this order from the front, and these are mutually coupled.

On a front end of the main shaft 2 of the transmission, the above-mentioned multiple disc clutch 1 is provided, and between the multiple disc clutch 1 and the front cover 41, the operating unit 20 of the above-mentioned multiple disc clutch 1 is provided. The operating lever 27a extending from the outer peripheral portion of the operating member 27 that forms part of the operating unit 20 extends downwardly in FIG. 2.

To a front end of the above-described front cover 41, a gear case 45 is connected. A shift spindle 46 extends in the fore-and-aft direction of the vehicle body while being supported by the gear case 45, the front cover 41, the front casing 42, the rear casing 43 and the rear cover 44. The shift spindle 46 is supported by the gear case 45 with a ball bearing 47 interposed therebetween and by the front cover 41 with a needle bearing 48 and a seal member 49 interposed therebetween. A front end of the shift spindle 46 is connected to rotational phase detecting means 50 formed of a potentiometer. On the outside of the rotational phase detecting means 50, a protector 51 is provided that is fixed to the gear case 45.

A gear chamber 52 is formed between the gear case 45 and the front cover 41. An electronically controlled actuator motor 53 is supported on an outside surface of the gear case 45. On a steering handle of the vehicle, an upshift switch and a downshift switch (which are not shown) are provided, and are electrically connected to the above-described motor. The above-described motor 53 rotates forward when the above-described upshift switch is pressed, and reverses when the downshift switch is pressed.

An output shaft 53a of the above-described motor 53 projects in the gear chamber 52. An output pinion 53b is formed on the motor output shaft 53a. By the gear case 45 and the front cover 41, a first reduction shaft 54 and a second reduction shaft 55 are supported so as to be rotatable. On the first reduction shaft 54, a large-diameter reduction gear 54a meshing with the output pinion 53b of the motor output shaft and a small-diameter reduction gear 54b adjacent thereto are formed integrally with the first reduction shaft 54. On the second reduction shaft 55, a large-diameter reduction gear 55a meshing with the above-described small-diameter reduction gear 54b and a small-diameter reduction gear 55b adjacent thereto are formed integrally with the second reduction shaft 55. On the shift spindle 46, a sector gear 56 meshing with the above-described small-diameter reduction gear 55b is fitted. The gears mesh with one another as described above, thereby configuring a gear train. Accordingly, by driving the motor 53 to rotate forward or to reverse, the shift spindle 45 is driven to rotate forward or to reverse. The actuator mechanism 40 is composed of the motor 53, the train of the gears 53b to 56, the shift spindle 46 and the like.

A sleeve 61 is spline-fitted to the shift spindle 46, and onto the sleeve 61 concerned, the clutch arm 62 is welded. In such a way, the clutch arm 62 is brought to a state of being fixed to the shift spindle 46. The roller 63 is provided on the tip of the clutch arm 62, and the roller 63 concerned is engaged with the engaging groove 27b, see FIG. 1, on the tip portion of the operating lever 27a extending from the operating member 27. The clutch operating mechanism 60 is composed of members 61 to 63.

By the front casing 42 and the rear casing 43, a shift drum 70 and a shift fork shaft 71 are supported in the fore-and-aft direction of the vehicle body. On an outer periphery of the shift drum 70, three cam grooves 70a, 70b and 70c are formed, and with these cam grooves, projecting pins 72a, 73a and 74a on base end portions of three shift forks 72, 73 and 74 are engaged. When the shift drum 70 is rotationally driven, the shift forks 72 to 74 axially move, and a predetermined speed of a gear transmission is established through an axially movable gear provided with a dog, that is, a so-called shifter gear, not shown. By a shift position detecting means 75 formed of a potentiometer connected to a rear end of the shift drum 70, a rotational drive position of the shift drum 70 is detected. The gear change mechanism 80 is provided between the shift spindle 46 and the shift drum 70.

Figure 3:
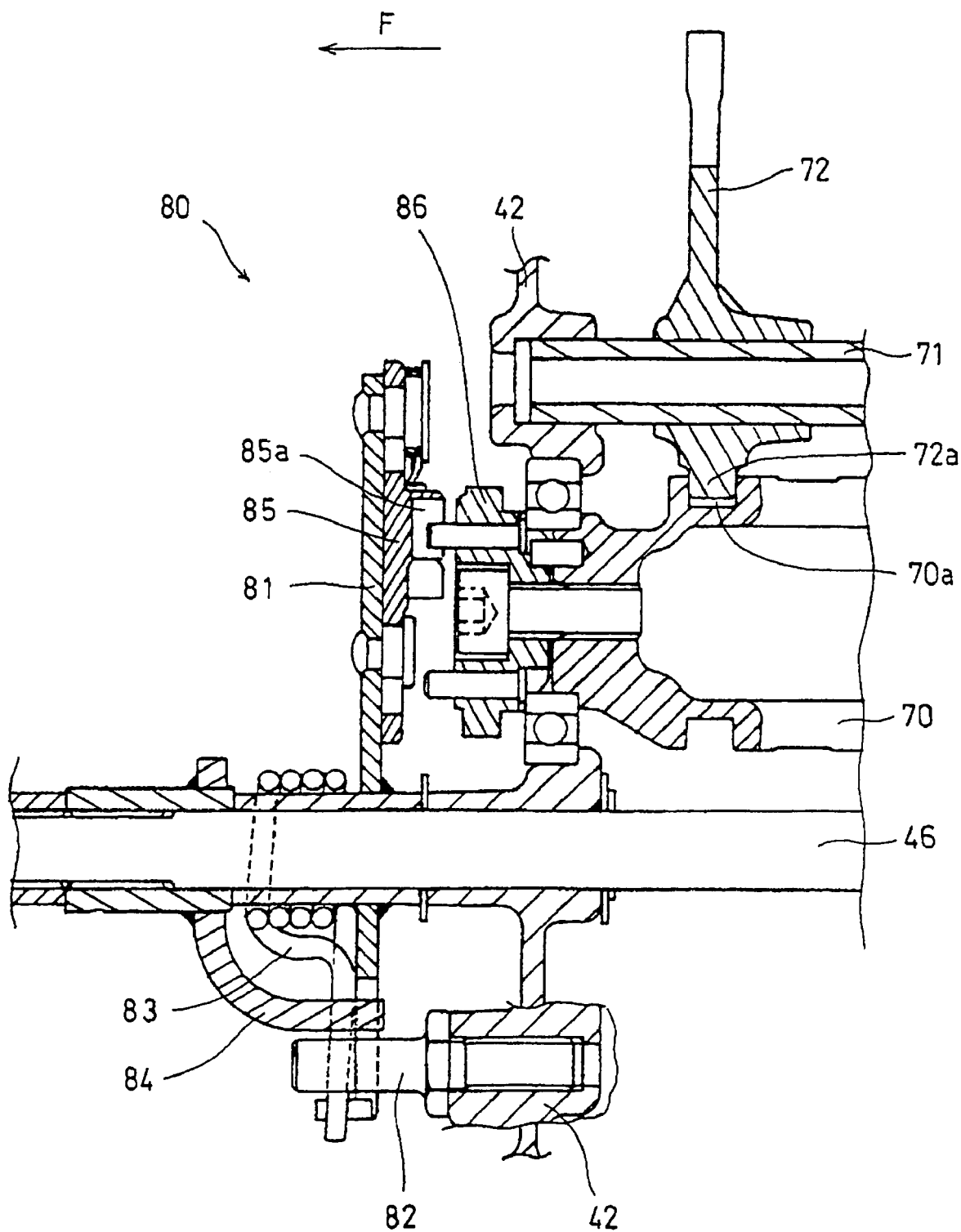
FIG. 3 is an enlarged side view of a gear change mechanism 80 of FIG. 2.

FIG. 3 is an enlarged side view of the gear change mechanism 80 of FIG. 2. The gear change mechanism 80 is configured by including a change arm 81 freely fitted to the shift spindle 46, a change arm reset spring 83 suspended between a pin 82 fixed to the front casing 42 and the shift spindle 46, an L-shaped drive arm 84 in which one end is fixed to the shift spindle 46 and the other end is engaged with the change arm 81, a shifter plate 85 provided on a tip portion of the change arm 81, a star plate 86 which is attached onto an end portion of the shift drum 70 and rotationally driven by a feed projection 85a of the above-described shifter plate 85, and the like. When the shift spindle 46 is rotationally driven, the L-shaped drive arm 84 is rotationally driven, the change arm 81 moves, the star plate 86 is pushed in the rotational drive direction by the projections 85a of the shifter plate 85. Thus, the shift drum 70 is rotationally driven.

Again in FIG. 2, in the vicinity of a rear end portion of the shift spindle 46, a secondary spindle 65 is supported by the rear casing 43 so as to be perpendicular to the shift spindle 46. An arm 66 fixed to one end of the secondary spindle 65 is engaged with an arm 67 fixed to a rear end of the shift spindle 46. A hexagonal portion 65a is formed on the other end of the secondary spindle 65.

The shift mechanism S of the power unit of the above-described embodiment is configured as described above. The operating mechanism 60 of the multiple disc clutch 1 of the present invention forms part of the above-described shift mechanism S. Next, a function of the above-described shift mechanism is described, and in the process of the description, the function of the multiple disc clutch 1 is described.

When the driver of the vehicle presses the upshift switch or the downshift switch, both not shown, which are provided on the steering handle, and thus the motor 53, shown in FIG. 2, is driven to rotate in a forward or a reverse direction, the shift spindle 46 rotationally moves forward or reverse through the train of the gears 53b to 56, and both of the L-shaped drive arm 84 and the clutch arm 62, which are fixed to the shift spindle 46, start to be moved in rotationally direction.

The L-shaped drive arm 84 rotationally drives the shift drum 70 through the change arm 81, the shifter plate 85 and the star plate 86, and attempts to rotationally drive the shift drum 70 from a certain speed position to the next speed position. In the case of this position change, a change of a connection gear by the shifter gear, that is, a gear change is performed. At this time, it is necessary to cut off power transmission from the crankshaft to the main shaft of the transmission. For this purpose, the engagement/release of the multiple disc clutch 1 is performed simultaneously with the gear change. As mentioned above, the clutch arm 62 is rotationally driven simultaneously with the rotational movement of the L-shaped drive arm 84 and the roller 63, provided on the tip of the clutch arm 62, pushes the operating lever 27a of the multiple disc clutch operating unit 20.

In FIG. 1, when the operating lever 27a is pushed, and thus the operating member 27 and the pressing force transmission member 30 coupled thereto by the rivet 31 are rotationally driven, the operating member 27 and the pressing force transmission member 30 is move to the left in FIG. 1 by the reaction force received from the fixed cam nose member 24 through the steel balls 28. The coupling plate 34 connected to the pressing force transmission member 30 with the ball bearing 32 and the annular member 33 interposed therebetween moves to the left in FIG. 1 in the large-diameter portions 35a of the bolts 35. The coupling plate 34 presses the release spring 37 while moving, thereby allowing the release spring 37 to generate the energizing force. Before the coupling plate 34 moves in the large-diameter portions 35a of the bolts 35, between the heads of the bolts 35 and the washers 36, and abuts on the washers 36, the energizing force of the release spring 37 exceeds the energizing force of the clutch spring 16. At this time, the clutch piston 13 is pushed to the coupling plate 34 through the release spring 37, and moves leftward in FIG. 1. At this time, the pressing force against the outer and inner friction discs 11 and 12 between the clutch center 7 and the clutch piston 13 is absorbed, and the engagement of the clutch is released through a half clutch state.

In FIG. 2, while the engagement of the multiple disc clutch 1 is being released, the above-mentioned gear change is completed, and the change arm 81 returns to an original position thereof by function of the change arm reset spring 83. Thereafter, being driven by the reverse direction rotation of the motor 53, the shift spindle 46 and the clutch arm 62 return to original positions thereof, the multiple disc clutch 1 returns to an original engaged state thereof, and the rotation of the crankshaft is transmitted to the main shaft 2. By the above process, the gear change for the power unit is performed.

When the motor 53 breaks down, the shift spindle 46 automatically returns to a neutral position by the energizing force of the above-described change arm reset spring 83. Moreover, at this time, by engaging a tool such as a wrench with the hexagonal portion 65a of the secondary spindle 65, it is possible to manually operate the shift drum 70 and the multiple disc clutch 1.

Figure 4:
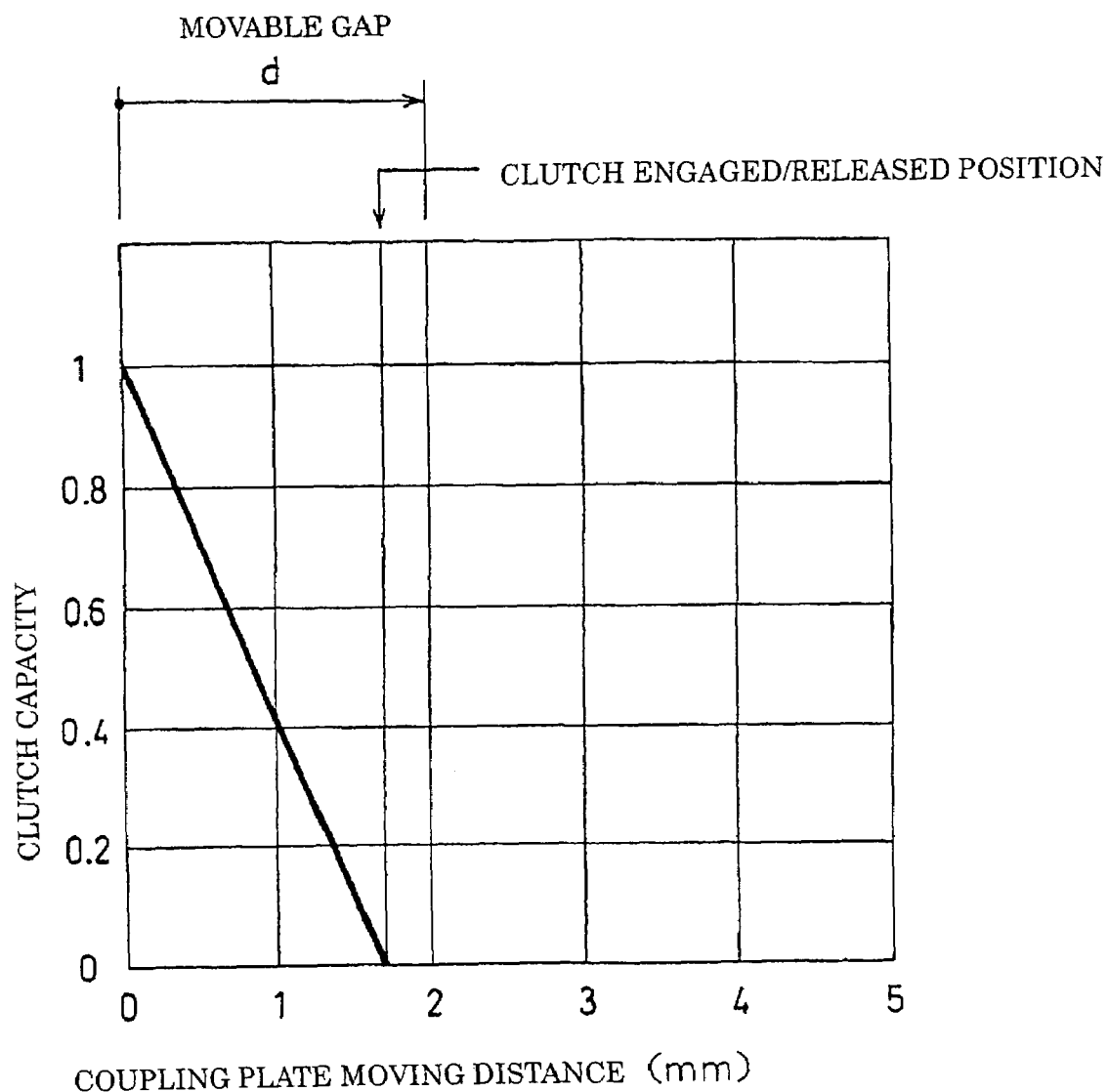
FIG. 4 is a view showing a relationship between a moving distance (unit: mm) of a coupling plate 34 and a clutch capacity in the multiple disc clutch 1.

FIG. 4 is a view showing a relationship between a moving distance (unit: mm) of the coupling plate 34 and a clutch capacity in the above-described multiple disc clutch 1. In a state where the moving distance of the coupling plate 34 is 0 mm, the state illustrated in FIG. 1, the clutch is in an engaged state, and the clutch capacity is displayed as 1. As the coupling plate 34 moves, the clutch capacity is lowered. This shows that the pressing force of the clutch piston 13 against the friction discs is reduced because the energizing force of the release spring 37 increases. Before the coupling plate 34 completes the movement thereof throughout the gap d, that is, before the coupling plate 34 abuts on the washers 36, the clutch capacity turns to 0. This shows a state where the energizing force of the clutch spring and the energizing force of the release spring are equalized to each other, the pressing force against the friction discs turns to 0, and the engagement of the clutch is released.

In the multiple disc clutch 1 of this embodiment, as described above, in the case of moving the clutch piston 13 against the energizing force of the clutch spring 16, a structure is adopted, in which the clutch piston 13 is not pushed directly and mechanically, but the clutch piston 13 is pushed by the spring force through the release spring 37. Accordingly, the relationship between the moving amount of the coupling plate and the clutch capacity can be set rather linear. Moreover, the clutch capacity can be controlled by the moving amount of the coupling plate and, accordingly, a smooth gear change with little shock is enabled. In the above-described embodiment, an example of performing the operation of engaging/releasing the multiple disc clutch by an electric motor has been described. However, the operation may also be performed by hand or by foot. Also in this case, a good-feeling in the operation is enabled with little shock.

Moreover, when the position where the energizing force of the release spring 37 exceeds the energizing force of the clutch spring 16 is set in the vicinity of the position of the washers 36 when the clutch piston 13 is located at the initial position, position of the clutch piston 13 when the clutch is engaged, which is shown in FIG. 1, there is also a case where the coupling plate 34 abuts on and mechanically pushes the washers 36. Also in such a setting, at the time when the coupling plate 34 abuts on the washers 36, an energizing force pushing the clutch piston 13, which is the result of the energizing forces of the clutch spring 16 and the release spring 37, becomes sufficiently small. Accordingly, a smooth gear change with little shock is enabled, and a sufficient effect is brought about.

Figure 5:
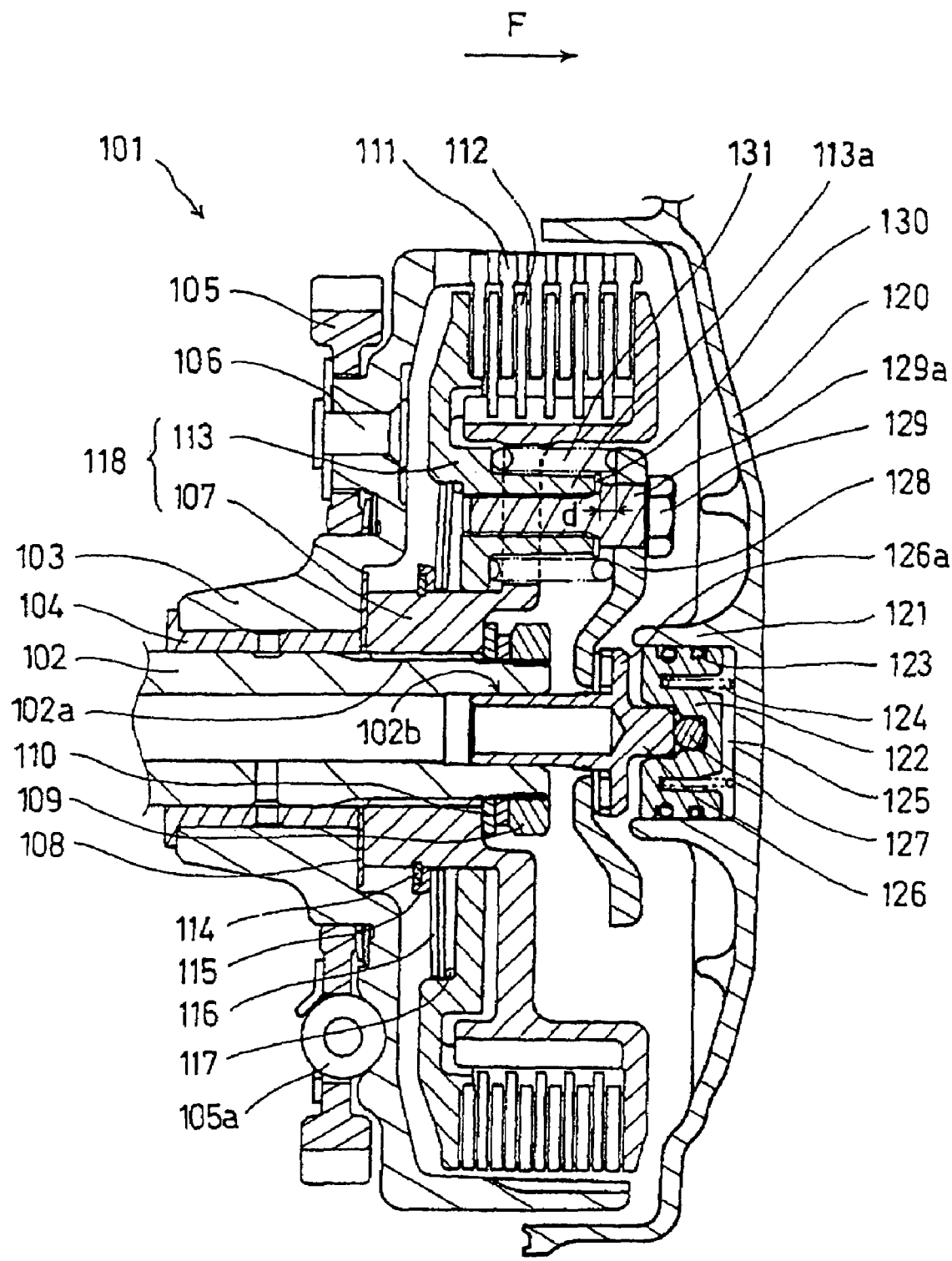
FIG. 5 is a longitudinal cross-sectional view of a multiple disc clutch 101 according to a second embodiment of the present invention.

FIG. 5 is a longitudinal cross-sectional view of a multiple disc clutch 101 according to a second embodiment of the present invention. This clutch is also placed on the rotational power transmission route from the crankshaft, not shown, of the power unit toward the main shaft of the transmission in the saddle riding vehicle, and is engaged and released in response to the gear change operation of the driver. A different point of this embodiment from the first embodiment is that the drive of the coupling plate is performed by hydraulic pressure.

To a main shaft 102 of a transmission, a clutch outer 103 is freely fitted with a sleeve 104 interposed therebetween so as to be rotatable with respect to the above-described main shaft 102. To the clutch outer 103, a body portion of a driven gear 105 is fixed by a rivet 106. A shock-absorbing member 105a is provided between the body portion of the driven gear 105 and a peripheral gear portion. The driven gear 105 meshes with a drive gear, not shown, of a crankshaft.

Onto the main shaft 102, a clutch center 107 is attached with a spline 102a interposed therebetween so as not to rotate. An annular member 108 is interposed between a boss portion of the clutch outer 103 and a boss portion of the clutch center 107, and a main shaft end side of the clutch center 107 is fixed by a nut 109 and a washer 110. More specifically, the clutch center 107 is fixed to the main shaft 102 of the transmission.

In the clutch outer 103 and the clutch center 107, a plurality of outer friction discs 111 and inner friction discs 112 are held, respectively, so as to be axially slidable and not to be rotatable about the main shaft, and are arranged in an alternately stacked state. Onto an outer periphery of the boss portion of the clutch center 107, a clutch piston 113 is attached so as to be axially slidable. In the clutch piston 113, a plurality of projecting portions 113a are provided that are inserted into a plurality of through holes provided in the clutch center 107, and project forward, to the right in FIG. 5. Thus, the clutch center 107 and the clutch piston 113 rotate integrally in the rotational direction about the main shaft 102. In this clutch 101, a clutch inner 118 is composed of the clutch center 107 and the clutch piston 113. The above-described outer and inner friction discs 111 and 112 that are arranged in an alternately stacked manner are sandwiched between an outer peripheral portion of the clutch center 107 and an outer peripheral portion of the clutch piston 113. More specifically, in the clutch inner 118, the outer friction discs 111 and the inner friction discs 112 are arrayed to be sandwiched by two members constituting the clutch inner 118.

A clutch spring 116 of a disc spring type, of which an inner periphery side is engaged by a clip 114 and a retainer 115, which are attached onto the boss portion of the clutch center 107, pushes the clutch piston 113 by an outer periphery side thereof through a spring set ring 117. The clutch spring 116 is energization to a direction where the clutch piston 113 is made to approach the fixed clutch center 107, and the clutch piston 113 presses the outer and inner friction discs 111 and 112 to a direction of engaging the multiple disc clutch 101. A configuration of the above-described portions, left half of FIG. 5, in this embodiment is substantially the same as that of the first embodiment.

A cylindrical portion 121 is provided in an extended direction of an axial line of the main shaft 102 on a backside of a front cover 120 of the power unit. Into the above-described cylindrical portion 121, a pressure-receiving piston 122 is fitted with a seal member 123 and a coil spring 124 interposed therebetween so as to be slidable in an axial direction of a cylinder shaft. A space separated by an inner surface of the cylindrical portion 121 and the pressure-receiving piston 122 is a hydraulic chamber 125. To the hydraulic chamber 125, a hydraulic pump, not shown, is connected.

In the main shaft 102, a center hole 102b in which one end is made open to a shaft end portion thereof is drilled. A pressing force transmission member 126 is provided between the main shaft 102 and the pressure-receiving piston 122. One end of the pressing force transmission member 126 is freely fitted to the center hole 102b of the above-described main shaft 102 so as to be axially slidable, and the other end is held on the above-described pressure-receiving piston 122 with a steel ball 127 interposed therebetween so as to be rotatable. The pressing force transmission member 126 includes a flange portion 126a. In the periphery of the above-described pressing force transmission member 126, a coupling plate 128 abuts on and is held by the flange portion 126a of the member 126.

Bolts 129 penetrating through holes provided in the above-described coupling plate 128 are screwed and fixed into female screw holes provided in the projecting portions 113a of a crank piston 113, while interposing washers 130 abut on end surfaces of large-diameter portions 129a of the bolts 129. A release spring 131 of a coil spring type, which exhibits a helical shape around each projecting portion 113a of the clutch piston 113, is provided with both ends thereof abutting on the clutch piston 113 and the coupling plate 128. The coil spring 124 interposed between a bottom surface of the above-described cylindrical portion 121 and the pressure-receiving piston 122 lightly pushes an end portion of the release spring 131 through the pressure-receiving piston 122, the steel ball 127, the pressing force transmission member 126 and the coupling plate 128. In a normal state, clutch engaged state, the energizing force of the release spring 131 is zero or an extremely small energizing force in comparison with energizing force of the clutch spring. In the large-diameter portions 129a of the above-described bolts 129, the coupling plate 128 is movable in an axial direction of the bolts 129 between heads of the bolts 129 and the washers 130. Such a movable gap d is 2 mm in this embodiment.

In the multiple disc clutch 101 of this embodiment, when pressurized oil is supplied to the hydraulic chamber 125 by the hydraulic pump, the pressure-receiving piston 122 receiving the hydraulic pressure moves toward the main shaft 102, and a pressing force thereof pushes the release spring 131 through the steel ball 127, the pressing force transmission member 126 and the coupling plate 128. When the release spring 131 is pushed and compressed by the coupling plate 128 and an energizing force exceeding the energizing force of the clutch spring 116 occurs, the clutch piston 113 moves by the energizing force of the release spring 131, and the engagement of the multiple disc clutch 101 is released. It is desirable that a position where the energizing force of the release spring 131 exceeds the energizing force of the clutch spring 116 be set before the gap between the coupling plate 128 and the washer 130 disappears, that is, before the position where the coupling plate 128 abuts on the washer 130. Alternatively, the above-described position may be set in the vicinity of a position of the washer 130 when the clutch piston 113 is located at an initial position, position of the clutch piston 113 when the clutch is engaged, which is shown in FIG. 5.

Also in the multiple disc clutch 101 of this embodiment, in the case of moving the clutch piston 113 against the energizing force of the clutch spring 116, a structure is adopted, in which the clutch piston 113 is not pushed directly and mechanically, but the clutch piston 113 is pushed by the spring force through the release spring 131. Accordingly, the relationship between the moving amount of the coupling plate and the clutch capacity can be set rather linear. Moreover, the clutch capacity can be controlled by the moving amount of the coupling plate. Accordingly, a smooth gear change is enabled with little shock.

Also, when the position where the energizing force of the release spring 131 exceeds the energizing force of the clutch spring 116 is set in the vicinity of the position of the washers 130 when the clutch piston 113 is located at the initial position, a smooth gear change with little shock is enabled, and a sufficient effect is brought about.

As described above in detail, in the multiple disc clutch of the present invention, the operation of releasing/engaging the clutch concerned can be performed gently, and operability thereof is improved. Moreover, the clutch spring and the release spring are arranged compactly, and a size of a clutch device is reduced. Furthermore, the thinning of the clutch spring and the ensuring of the size of the release spring are implemented, and accordingly, the spring characteristics thereof are optimized. While a good-feeling operation with little shock is enabled in the operation by hand or by foot, the multiple disc clutch can also be operated by the actuator motor with electronic control. Accordingly, in this case, the control of the clutch operation is facilitated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multiple disc clutch including a clutch outer and a clutch inner, comprising:
   said clutch inner including a clutch center and a clutch piston, and outer friction discs and inner friction discs alternately arranged between the clutch center and the clutch piston;
   a clutch spring for performing energization to narrow an interval between the clutch center and the clutch piston constituting the clutch inner;
   a clutch release mechanism for reducing frictional force between the outer friction discs and the inner friction discs and for releasing an engaged state of the clutch by widening the interval between the clutch center and the clutch piston constituting the clutch inner; and
   a release spring provided between the clutch piston and the clutch release mechanism.

2. The multiple disc clutch according to claim 1, wherein the release spring is opposite to the clutch spring, and is provided in the inside adjacent to the inner and outer friction discs.

3. The multiple disc clutch according to claim 2, wherein the clutch spring is a disc spring shape, and the release spring is a coil spring shape.

4. The multiple disc clutch according to claim 3, wherein the clutch release mechanism is operated by an actuator motor with electronic control.

5. The multiple disc clutch according to claim 1, wherein said clutch piston includes a projecting portion projecting through an aperture in said clutch center for mounting said release spring thereon.

6. The multiple disc clutch according to claim 5, and further including an operating lever operatively connected to a distal end of said release spring for imparting a limited movement thereto for compressing the release spring and exerting a force exceeding a force of said clutch spring for disengaging the clutch.

7. The multiple disc clutch according to claim 6, wherein a gap is provided between the distal end of said release spring and a distal end of said projecting portion wherein said operating lever imparts movement to said distal end of said release spring in this gap and wherein said force of said clutch spring is overcome prior to the distal end of said spring being aligned with the distal end of the projecting portion.

8. The multiple disc clutch according to claim 7, and further including a bolt with an enlarged diameter disposed adjacent to a head portion of said bolt, said release spring extending over said enlarged diameter portion of said bolt and a washer being provided adjacent to said distal end of said release spring for enabling said operating lever to impart movement to said washer and the distal end of said release spring for overcoming the force of said clutch spring.

9. The multiple disc clutch according to claim 1, wherein said clutch piston includes a plurality of projecting portions projecting, respectively, through a plurality of apertures in said clutch center for mounting, respectively, a plurality of release springs thereon.

10. The multiple disc clutch according to claim 1, and further including a pressure-receiving piston operatively connected to said clutch release mechanism and a pressure-receiving chamber for receiving a pressurized fluid for selectively imparting movement to said pressure-receiving piston.

11. A multiple disc clutch comprising:
a clutch outer;
a clutch inner, said clutch inner including a clutch center and a clutch piston;
outer friction discs and inner friction discs alternately arranged between the clutch outer and the clutch inner;
a clutch spring for normally engaging the outer friction discs and the inner friction discs;
a clutch release mechanism for reducing frictional force between the outer friction discs and the inner friction discs and for releasing an engaged state of the clutch by widening an interval between the clutch center and the clutch piston constituting the clutch inner; and
a release spring operatively positioned between the clutch piston and the clutch release mechanism for selectively overcoming a force of said clutch spring.

12. The multiple disc clutch according to claim 11, wherein the release spring is opposite to the clutch spring, and is provided in the inside adjacent to the inner and outer friction discs.

13. The multiple disc clutch according to claim 12, wherein the clutch spring is a disc spring shape, and the release spring is a coil spring shape.

14. The multiple disc clutch according to claim 13, wherein the clutch release mechanism is operated by an actuator motor with electronic control.

15. The multiple disc clutch according to claim 11, wherein said clutch piston includes a projecting portion projecting through an aperture in said clutch center for mounting said release spring thereon.

16. The multiple disc clutch according to claim 15, and further including an operating lever operatively connected to a distal end of said release spring for imparting a limited movement thereto for compressing the release spring and exerting a force exceeding a force of said clutch spring for disengaging the clutch.

17. The multiple disc clutch according to claim 16, wherein a gap is provided between the distal end of said release spring and a distal end of said projecting portion wherein said operating lever imparts movement to said distal end of said release spring in this gap and wherein said force of said clutch spring is overcome prior to the distal end of said spring being aligned with the distal end of the projecting portion.

18. The multiple disc clutch according to claim 17, and further including a bolt with an enlarged diameter disposed adjacent to a head portion of said bolt, said release spring extending over said enlarged diameter portion of said bolt and a washer being provided adjacent to said distal end of said release spring for enabling said operating lever to impart movement to said washer and the distal end of said release spring for overcoming the force of said clutch spring.

19. The multiple disc clutch according to claim 11, wherein said clutch piston includes a plurality of projecting portions projecting, respectively, through a plurality of apertures in said clutch center for mounting, respectively, a plurality of release springs thereon.

20. The multiple disc clutch according to claim 11, and further including a pressure-receiving piston operatively connected to said clutch release mechanism and a pressure-receiving chamber for receiving a pressurized fluid for selectively imparting movement to said pressure-receiving piston.

* * * * *